United States Patent
LeMaire et al.

(10) Patent No.: US 6,673,952 B2
(45) Date of Patent: Jan. 6, 2004

(54) METHOD FOR EXTRACTING AND FRACTIONATING FATS WITH SOLVENT, USING AT LEAST A HYDROFLUROETHER

(75) Inventors: Benoit LeMaire, Locoal Mendon (FR); Michel Surbled, Saint-Nolff (FR); Jacques Zwegers, Monterblanc (FR); Bernard Mompon, Vannes (FR)

(73) Assignee: Extractive, Vannes (FR)

( * ) Notice: Subject to any disclaimer, the term of this patent is extended or adjusted under 35 U.S.C. 154(b) by 0 days.

(21) Appl. No.: 10/168,459

(22) PCT Filed: Dec. 12, 2000

(86) PCT No.: PCT/FR00/03658

§ 371 (c)(1), (2), (4) Date: Sep. 9, 2002

(87) PCT Pub. No.: WO01/46354

PCT Pub. Date: Jun. 28, 2001

(65) Prior Publication Data

US 2003/0091709 A1 May 15, 2003

(30) Foreign Application Priority Data

Dec. 21, 1999  (FR) ............................................ 99 16196

(51) Int. Cl.$^7$ .................................................. C11B 1/00
(52) U.S. Cl. ............................... 554/21; 554/8; 554/12; 554/13; 554/20
(58) Field of Search ............................. 554/8, 20, 21, 554/12, 13

(56) References Cited

FOREIGN PATENT DOCUMENTS

| GB | 2 288 552 A | 2/1995 |
|---|---|---|
| WO | WO 99/26903 | 11/1998 |
| WO | WO-99/26903 | * 11/1998 |

* cited by examiner

*Primary Examiner*—Deborah Carr
(74) *Attorney, Agent, or Firm*—Westman, Champlin & Kelly, P.A.

(57) ABSTRACT

The invention concerns a method for extracting and fractionating fats contained in a raw material, characterized in that it comprises at least a step which consists in using an extraction solvent consisting of at least a hydrofluoroether of general formula (I): $C_nF_{2n+1}OC_mH_{2m+1}$, wherein: n ranges between 3 and 6 and m ranges between 1 and 5 and at least a separation step enabling to obtain a raw extract of fats rich in unsaponifiable substances and optionally, in free fatty acids and a insoluble extraction fraction.

20 Claims, No Drawings

METHOD FOR EXTRACTING AND FRACTIONATING FATS WITH SOLVENT, USING AT LEAST A HYDROFLUROETHER

CROSS-REFERENCE TO RELATED APPLICATION

This Application is a Section 371 National Stage Application of International Application No. PCT/FR00/03658 filed Dec. 21, 2000 and published as WO 01/46354 on Jun. 28, 2001, not in English.

1. Field of the Invention

The invention concerns the field of extraction chemistry.

2. Background of the Invention

More precisely, the present invention relates to the extraction of fatty material from natural raw materials.

The fatty materials, principally those of plant origin, are ingredients widely used by the food, cosmetic and pharmaceutical industries.

However, these fatty materials may rarely be used in the crude state and must generally be subjected to a refining in order to remove one or more undesirable components, the nature of which depends on the applications provided for the refined product.

Thus, the cosmetic and pharmaceutical industries use fatty materials enriched in unsaponifiable materials that is according to the French standard NFT 60-205-1 in substances which, after saponification of the fatty material by potassium hydroxide and extraction by a specified solvent, are not volatile under specified conditions. The fatty materials enriched in unsaponifiables have particularly high contents of hydrocarbons, heavy alcohols (aliphatic or terpene), sterols and tocopherols and are obtained after removal of a part of the triglycerides which are the predominant components of the crude fatty material.

Among the numerous extraction and fractionation methods of fatty materials proposed in the state of the technique, solvent extraction is a very widespread technique which is available according to numerous technological variants.

Thus, the patent application FR 2 702 773 proposes a method for preparation of fractions of plant fatty materials enriched in unsaponifiable materials. In this method, the plant fatty material is treated with acetone so as to recover, on the one hand a fraction insoluble with heat, rich in unsaponifiable and on the other hand, a soluble fraction subjected later to a cold crystallization step. After filtration of the precipitate, the filtrate is evaporated to dryness. The evaporation residue also forms a fraction enriched in unsaponifiable. On the other hand, the precipitate is enriched in triglycerides.

It will be noted that, according to the raw material from which they are extracted, the plant fatty materials have different compositions, qualitatively and quantitatively. These differences may justify the use of solvents different from acetone (for example, hexane or ethanol) as much at the hot extraction step as at the cold precipitation step.

The principal drawback of the extraction and fractionation methods by solvent results from the use of organic solvents (alkanes, ketones, esters, alcohols, ethers, chlorinated solvents) which subject the extract obtained to regulatory constraints related to the contents of residual solvents. In fact, whatever their nature, these organic solvents are either harmful or toxic. This harmfulness and this toxicity are demonstrated at generally low contents of residual solvents in the extracts obtained. In order to eliminate the health-related risks, therefore it is necessary to use desolvation methods which present several drawbacks. In fact, beside the additional cost that they incur, these desolvation methods, according to the operating conditions applied, may have a negative effect on the quality of the extracts thus treated.

These constraints also concern the risks of solvent discharge in liquid or gaseous form in the natural medium. Finally, with the exception of the alkanes, the traditional extraction solvents present the drawback of not having total chemical inertness, risking leading to denaturation of the products obtained, according to the extraction conditions or storage of the extracts.

BRIEF SUMMARY OF THE INVENTION

The principal objective of the present invention is to propose an extraction and fractionation method of fatty material by a solvent that does not present such drawbacks.

Such a method according to the invention is characterized in that it consists of at least one step using an extraction solvent formed by at least a hydrofluoroether (abbreviated HFE) with general formula (I):

$$C_nF_{2n+1}OC_mH_{2m+1}$$

in which n is between 3 and 6 and m is between 1 and 5 and at least one separation step leading to obtaining on the one hand a crude extract of fatty material rich in unsaponifiable materials and, possibly, in free fatty acids and on the other hand, to an extraction insoluble fraction.

These hydrofluoroethers, by comparison with conventional solvents, present the following advantages by comparison with conventional solvents.

They are non-flammable and because of this, do not require the use of specific production and protection equipment. This characteristic is very particularly interesting from the angle of production on industrial scale since it has a direct effect on the cost of the finished products;

They do not present a risk for the ecosystem and are in conformity with the strictest environmental regulations (zero potential for destruction of the ozone layer and very low contribution to the greenhouse effect);

They are chemically inert, odorless, colorless and flavorless. Therefore, they do not have any negative effect on the properties of extracts or formulations which contain them or which they are used to prepare.

Even at high doses, they are nontoxic by inhalation, absorption or repeated contact;

Finally, they have a low thermal capacity and latent heat of vaporization compared with those of organic solvents currently used in extraction; therefore, the method according to the invention is not very costly in energy.

Preferentially, said hydrofluoroether is chosen from methoxynonafluorobutane with formula $C_4F_9$—O—$CH_3$ (also designated in the chemical industry by the name HFE7100) and ethoxynonafluorobutane $C_4F_9$—O—$C_2H_5$ (also designated in the chemical industry by the name HFE-7200).

These compounds present the advantage of having boiling points of 60° C., for methoxynonafluorobutane and 78° C. for ethoxynonafluorobutane which allow their use in traditional solid-liquid or liquid-liquid extraction equipment without notable modification of these latter. Moreover, these hydrofluoroethers may be used in the extraction methods resorting to new technologies such as microwaves or ultrasound.

It will be noted that the use of hydrofluoroethers as extraction agents has already been described in the patent PCT FR98/02546. This document discloses the solubilizing nature of the HFE for the preparation of plant extracts, however in contrast to the present invention, without bringing out the particularly selective nature of these HFE with respect to the particular classes of chemical compounds that are lipid fractions rich in unsaponifiable materials.

On the other hand, the present invention shows that the HFE, with good selectivity are likely to extract such lipid fractions rich in unsaponifiable materials.

It will be noted that this selectivity is not total since the HFE with formula (I) coextract the lipid substances not belonging to the category of unsaponifiable materials, in particular triglycerides and free fatty acids. The coextraction of free fatty acids in certain cases forms an additional advantage of the method, particularly in the case of matrixes containing free fatty acids of pharmaceutical, cosmetic or nutritional interest.

According to a preferential variant of the invention, it is possible to enrich again the crude extract of obtained fatty material, rich in unsaponifiable substances and free fatty acids, by a precipitation step selective for coextracted triglycerides consisting of cooling said crude extract to a temperature lower than the extraction temperature.

Therefore, the method according to the invention makes it possible to fractionate the fatty material into fractions enriched in unsaponifiable materials and into free fatty acids and into fractions enriched in triglycerides.

The fractions obtained may be as well suited for cosmetic applications as for pharmaceutical or food applications.

According to a preferential variant of the invention, the method comprises an additional step consisting of decanting said filtrate then evaporating the latter so as to recover a soluble extract very enriched in unsaponifiable substances and in free fatty acids.

According to another advantageous aspect of the method according to the invention, said insoluble fraction is recycled to the beginning of the method.

It will be noted that the method according to the invention could be used in the presence of at least one cosolvent chosen from alkanes, ketones, alcohols, alkyl ethers, carboxylic acids, esters, amides, halogenated hydrocarbons, acetals.

The invention as well as the different advantages that it presents will now be more easily understood as a result of the description that follows with examples that are nonlimiting for its achievement.

DETAILED DESCRIPTION OF PREFERRED EMBODIMENTS

EXAMPLE 1

Fractionation of Shea Butter and a Fraction Enriched in Triglycerides and a Fraction Enriched in unsaponifiable Shea butter (20 g) measured at 7–8% unsaponifiables, shaken at 40° C. for 1 h 30 min in 2 liters of ethoxynonafluorobutane ($C_4F_9$—O—$C_2H_5$). After stopping the shaking, the suspension is left to decant for 20 min. The fluorinated phase is then separated from the extraction insoluble then cooled to 8° C. After 2 h of decanting, the cooled suspension is filtered on a screen with mesh of 10 µm. The clear filtrate is evaporated to dryness.

The qualitative analysis of the fractions is carried out by thin layer chromatography (silica) with the aid of a hexane/ethyl ether/acetic acid eluant in proportions by volume of 90/10/1. Deposits correspond to 6 µL of hexane solutions at 20 mg/mL. The plates are dried then visualized by ethanol with 5% sulphuric acid (drying at 110° C.). The results show clearly that the $P_E$ fraction (precipitated extract) is formed nearly exclusively of triglycerides. On the other hand, the SE fraction (soluble extract) is very enriched in unsaponifiable substances (karitene, sterols and fatty alcohols especially). These results are summarized in Table 1 below.

TABLE 1

|  | INS (extraction insoluble) | PE (precipitate extract) | SE (soluble extract) |
| --- | --- | --- | --- |
| Extraction yield by weight (related to shea butter) | 85.7% | 8.5% | 5.8% |
| Appearance Characteristics | White solid Poor in unsaponifiables | White solid Enriched in triglycerides | Yellow liquid Very enriched in unsaponifiables |

EXAMPLE 2

Compared Extractions of Cacao Cake with Hexane and Ethoxynonafluorobutane using Soxhlet This example is designed to provide an element of comparison where it concerns extraction yields with hexane and the extraction yields with ethoxynonafluorobutane.

Cacao cakes (50 g) are extracted using Soxhlet for 5 h with hexane. After extraction, the hexane extract is evaporated and the yield of extract is calculated based on the weight of the cacao cakes used.

Cacao cakes (50 g) are extracted using Soxhlet for 5 h by ethoxynonafluorobutane ($C_4F_9$—O—$C_2H_5$). After extraction, the extract is cooled to ambient temperature (20° C.). This operation makes it possible to decant an insoluble fraction. After removal of the insoluble fraction the fluorinated supernatant is evaporated. The yields of insolubilised extract and soluble extract are calculated on the basis of the weight of the cakes used.

The compared results of extraction with hexane and, according to the invention, extraction with ethoxynonafluorobutane, are given in Table 2 below.

TABLE 2

|  | Extraction with hexane | Extraction with $C_4F_9$—O—$C_2H_5$ |
| --- | --- | --- |
| Yield of soluble extract | 3.4% | 1.8% |
| Yield of extract insolubilised at ambient temperature | — | 1.6% |
| Total yield | 3.4% | 3.4% |

EXAMPLE 3

Extraction of Cacao Cakes with Ethoxynonafluorobutane in 4 Successive Extractions Cacao cakes (500 g) are extracted under shaking at 65° C. for 1 hour 30 min by 2 liters (2.86 kg) of ethoxynonafluorobutane ($C_4F_9$—O—$C_2H_5$). The suspension is rapidly filtered on a filtering screen with 10 μm mesh. The filtrate is cooled to 20° C. in order to precipitate an insoluble as in Example 2. The insoluble is filtered on filtering screen with 10 μm mesh. The intermediate yield in insoluble fraction is calculated on the basis of the weight of the cakes used. The filtrate obtained is returned to the extractor for a new extraction cycle using the preceding extraction insoluble. In all, four extraction cycles are carried out according to the same operating method. At the end of the last cycle, the final filtrate (separated from the insoluble precipitated at 20° C.) is evaporated under reduced pressure. The yield in soluble materials is expressed by comparison with the weight of the cakes used. The results are provided in Table 3 below.

TABLE 3

|  | Weight (g) | Intermediate yield | Cumulative yield |
| --- | --- | --- | --- |
| Extract 1 insolubilised at 20° C. | 4.03 | 0.81 | 0.81 |
| Extract 2 insolubilised at 20° C. | 3.68 | 0.74 | 1.55 |
| Extract 3 insolubilised at 20° C. | 1.55 | 0.31 | 1.86 |
| Extract 4 insolubilised at 20° C. | 1.06 | 0.21 | 2.07 |
| Soluble materials n the final filtrate | 3.46 | 0.69 | 2.76 |

The extracts insolubilised at 20° C. are yellow in color. The soluble extract is clearer with a strong odor of cocoa.

The qualitative analysis of the fractions is carried out by thin layer chromatography (silica) with the aid of a hexane/ethyl ether/acetic acid eluant in proportions by volume of 90/10/1. Deposits correspond to 6 μL of hexane solutions at 20 mg/mL. The plates are dried then visualized by ethanol with 5% sulphuric acid (drying at 110° C.). The results show that the insolubilised extracts are enriched in triglycerides and that the soluble materials of the final filtrate are on the other hand, enriched in unsaponifiable materials. In addition, a content of free fatty acids is observed that is much higher in the soluble materials of the final filtrate than in the insolubilised extracts.

The examples described above in reference to shea butter and to cacao illustrate several possibilities of applications of the present invention and do not limit the scope of the present invention. In fact, fractionation by the hydrofluoroethers may be applied to numerous other fatty materials or natural matrixes renowned for their lipid profile as well as for their uses principally for cosmetic, pharmaceutical or food purposes (especially avocado, wheat germ oil, squash and pumpkin seed oil, saw palmetto fruits (*Serenoa repens*), husks of *Pygeum africanum* (*Prunus africana*). The invention may also be applied to animal raw materials, to raw materials of animal origin (milk and derivatives, egg products, lanolin, beeswax) as well as to unicellular organisms (yeasts, mushrooms, bacteria).

EXAMPLE 4

Fractionation of Shea Butter by Ethoxynonafluorobutane

This example describes the influence of various operating parameters on the fractionation of shea butter by ethoxynonafluorobutane (HFE7200). These parameters are extraction temperature, retreatment temperature of the extract and the number of cycles of extraction carried out on the same shea butter load.

50 g of shea butter (measuring 6.5% in unsaponifiable) are extracted with 2 liters of ethoxynonafluorobutane under mild shaking for 30 min and at the extraction temperature $T_E$ (50 or 70° C.). After decantation, the biphasic medium is separated into a crude extract (CE1) and a raffinate. The raffinate is subjected two more times to the same extraction operating method allowing two more crude extracts to be obtained (CE2 and CE3). The three crude extracts (CE1, CE2 and CE3) are stored overnight at a precipitation temperature $T_P$ (4° C. or ambient temperature) in order to cause precipitation of part of the triglycerides and thus, to increase the content of fluorinated extracts as unsaponifiable. After separation of the precipitates and the supernatants, then removal of the solvent, 3 precipitated extracts are obtained, respectively, noted PE1, PE2, PE3 and 3 soluble extracts, noted SE1, SE2, SE3.

The indicators making it possible to evaluate the influence of the three operating parameters are the weight of the soluble extracts, SE1, SE2 and SE3, the unsaponifiable content of the soluble extracts SE1, SE2 and SE3, the extracted unsaponifiable weight present in the extracts SE1, SE2 and SE3 and the weights of the precipitated extracts, PE1, PE2 and PE3.

Table 4 below expresses the influence of these three operating parameters.

TABLE 4

| Precipitation temperature $T_P$ (° C.) Extraction | | Ambient temperature | | 4° C. | |
| --- | --- | --- | --- | --- | --- |
| temperature $T_E$ (° C.) | | 50 | 70 | 50 | 70 |
| Weight of soluble extract (g) | SE1 | 1.50 | 1.46 | 0.89 | 0.89 |
| | SE2 | 1.24 | 1.23 | 0.72 | 0.74 |
| | SE3 | 1.09 | 1.14 | 0.57 | 0.58 |
| | total | 3.83 | 3.83 | 2.18 | 2.21 |
| Unsaponifiable content of soluble extracts (% w/w) | SE1 | 29.3 | 31.0 | 48.2 | 52.6 |
| | SE2 | 19.7 | 22.9 | 41.1 | 42.4 |
| | SE3 | 17.3 | 16.6 | 35.5 | 35.5 |
| Weight of unsaponifiable extracted, present in the soluble extracts (mg) | SE1 | 440 | 456 | 430 | 470 |
| | SE2 | 244 | 282 | 295 | 314 |
| | SE3 | 189 | 189 | 203 | 205 |
| | total | 873 | 927 | 928 | 989 |
| Weight of precipitated extract (g) | PE1 | 2.10 | 5.17 | 2.15 | 4.72 |
| | PE2 | 2.18 | 5.20 | 2.26 | 4.62 |
| | PE3 | 2.30 | 5.01 | 2.19 | 4.78 |
| | total | 6.58 | 15.38 | 6.60 | 14.12 |

The results according to the table indicate that:

The amount of soluble extract depends only on the precipitation temperature. It increases with $T_P$ and decreases with each extraction cycle.

The unsaponifiable content depends only on the precipitation temperature. It increases when $T_P$ decreases and it decreases with each extraction cycle.

The weight of unsaponifiable extracted remains more or less constant, whatever the extraction and precipitation temperatures. It decreases with each extraction cycle.

The amount of precipitated extract depends only on the extraction temperature. It increases with $T_E$ and in addition remains constant whatever the extraction cycle.

The critical parameter therefore is the precipitation temperature:

for a low precipitation temperature (e.g.: 4° C.) the extraction will be selective (high unsaponifiable content) but less effective (low amount of soluble extract)

for a high precipitation temperature (e.g.: ambient T) the extraction will be effective (high amount of soluble extract) but not very selective (average unsaponifiable content)

It will be noted that the most selective extraction ($T_P$=4° C.; $1^{st}$ extraction cycle) leads to a content of unsaponifiable extract on the order of 50%. The enrichment factor is on the order of 7.7.

EXAMPLE 5

Fractionation of Shea Butter by Ethoxynonafluorobutane (HFE7200) at 50° C.— Influence of the Precipitation Temperature Example 4 shows that the extraction temperature has no significant influence on the selectivity or efficacy of the extraction. As a result in this example, the shea butter is treated at an extraction temperature of 50° C. just higher than its liquefaction temperature.

The operating method of extraction is identical to that of Example 4 with the exception of the precipitation temperatures: −18° C., 4° C. and ambient temperature.

TABLE 5

| Extraction temperature $T_E$ (° C.) Precipitation temperature $T_P$ (° C.) | | Ambient T | 50 4 | −18 |
|---|---|---|---|---|
| Weight of soluble extract (g) | SE1 | 1.50 | 0.89 | 0.58 |
| | SE2 | 1.24 | 0.72 | 0.42 |
| | SE3 | 1.09 | 0.57 | 0.31 |
| | total | 3.83 | 2.18 | 1.31 |
| Unsaponifiable content of soluble extracts (% w/w) | SE1 | 29.3 | 48.2 | 70.3 |
| | SE2 | 19.7 | 41.1 | 67.4 |
| | SE3 | 17.3 | 35.5 | 66.5 |
| Weight of unsaponifiable extracted present in the soluble extracts (mg) | SE1 | 440 | 430 | 408 |
| | SE2 | 244 | 295 | 285 |
| | SE3 | 189 | 203 | 205 |
| | total | 873 | 928 | 898 |
| Weight of precipitated extract (g) | PE1 | 2.10 | 2.15 | 2.78 |
| | PE2 | 2.18 | 2.26 | 2.85 |
| | PE3 | 2.30 | 2.19 | 2.86 |
| | total | 6.58 | 6.60 | 8.49 |

The results from Table 5 indicate that:

As in the preceding example, the amount of soluble extract increases with $T_P$ and decreases with each extraction cycle.

As in the preceding example, the unsaponifiable content increases when $T_P$ decreases and it decreases with each extraction cycle.

As in the preceding example, the weight of unsaponifiable extracted remains more or less constant, whatever the precipitation temperature. It decreases with each extraction cycle.

In contrast to that which the preceding example demonstrates, the amount of precipitated extract becomes dependent on the precipitation temperature. It increases when $T_P$ is low at −18° C. On the other hand, it remains constant whatever the extraction cycle.

The general conclusions remain unchanged:

for a low precipitation temperature (e.g.: −18° C.) the extraction will be selective (high unsaponifiable content) but less effective (low amount of soluble extract)

for a high precipitation temperature (e.g.: ambient T) the extraction will be effective (high amount of soluble extract) but not very selective (average amount of unsaponifiable content)

It will be noted that the most selective extraction ($T_P$=−18° C.; $1^{st}$ extraction cycle) leads to a content of unsaponifiable extract on the order of 70%. The enrichment factor is on the order of 10.7.

What is claimed is:

1. A method of extraction and fractionation of fatty material from a raw material, characterized in that it comprises at least one extraction step using an extraction solvent formed by at least a hydrofluoroether with general formula:

$$C_nF_{2n+1}OC_mH_{2m+1}$$

in which n is between 3 and 6 and in is between 1 and 5 and at least one separation step leading to obtaining crude extract of fatty material rich in unsaponifiable substances, and possibly free fatty acids, and an insoluble extraction fraction.

2. The method according to claim 1 characterized in that said hydrofluoroether is chosen from methoxynonafluorobutane ($C_4F_9$—O—$CH_3$) and ethoxynonafluorobutane ($C_4F_9$—O—$C_2H_5$).

3. The method according to claim 1 characterized in that it includes a precipitation step selective for triglycerides present in said crude extract consisting of cooling said crude extract to a temperature lower than the extraction temperature, and filtering said crude extract in order to obtain a precipitated extract and a filtrate.

4. The method according to claim 3 characterized in that it includes additional steps of decanting said filtrate then of evaporating it so as to recover a soluble extract.

5. The method according to claim 1 characterized in that the extraction and separation steps are iteratively repeated using said insoluble extraction fraction recycled from a prior iteration for the raw material.

6. The method according to claim 1 characterized in that it is used in the presence of at least one cosolvent chosen from alkanes, ketones, alcohols, alkyl ethers, carboxylic acids, esters, amides, halogenated hydrocarbons, acetals.

7. The method according to claim 2 characterized in that it includes a precipitation step selective for triglycerides present in said crude extract consisting of cooling said crude extract to a temperature lower than the extraction temperature, and filtering said crude extract in order to obtain a precipitated extract and a filtrate.

8. The method according to claim 7 characterized in that it includes an additional steps of decanting said filtrate then of evaporating it so as to recover a soluble extract.

9. The method according to claim 7 characterized in that the extraction and separation steps are iteratively repeated using said insoluble extraction fraction recycled from a prior iteration for the raw material.

10. The method according to claim 7 characterized in that it is used in the presence of at least one cosolvent chosen from alkanes, ketones, alcohols, alkyl ethers, carboxylic acids, esters, amides, halogenated hydrocarbons, acetals.

11. The method according to claim 2 characterized in that it is used in the presence of at least one cosolvent chosen from alkanes, ketones, alcohols, alkyl ethers, carboxylic acids, esters, amides, halogenated hydrocarbons, acetals.

12. The method according to claim 2 characterized in that the extraction and separation steps are iteratively repeated using said insoluble extraction fraction recycled from a prior iteration for the raw material.

13. The method according to claim 12 characterized in that it is used in the presence of at least one cosolvent chosen from alkanes, ketones, alcohols, alkyl ethers, carboxylic acids, esters, amides, halogenated hydrocarbons, acetals.

14. The method according to claim 3 characterized in that it is used in the presence of at least one cosolvent chosen from alkanes, ketones, alcohols, alkyl ethers, carboxylic acids, esters, amides, halogenated hydrocarbons, acetals.

15. The method according to claim 3 characterized in that the extraction and separation stews are iteratively repeated using said insoluble extraction fraction recycled from a prior iteration for the raw material.

16. The method according to claim 15 characterized in that it is used in the presence of at least one cosolvent chosen from alkanes, ketones, alcohols, alkyl ethers, carboxylic acids, esters, amides, halogenated hydrocarbons, acetals.

17. The method according to claim 4 characterized in that it is used in the presence of at least one cosolvent chosen from alkanes, ketones, alcohols, alkyl ethers, carboxylic acids, esters, amides, halogenated hydrocarbons, acetals.

18. The method according to claim 4 characterized in that the extraction and separation steps are iteratively repeated using said insoluble extraction fraction recycled from a prior iteration for the raw material.

19. The method according to claim 12 characterized in that it is used in the presence of at least one cosolvent chosen from alkanes, ketones, alcohols, alkyl ethers, carboxylic acids, esters, amides, halogenated hydrocarbons, acetals.

20. The method according to claim 5 characterized in that it is used in the presence of at least one cosolvent chosen from alkanes, ketones, alcohols, alkyl ethers, carboxylic acids, esters, amides, halogenated hydrocarbons, acetals.

* * * * *